(12) United States Patent
Chang et al.

(10) Patent No.: US 9,807,991 B1
(45) Date of Patent: Nov. 7, 2017

(54) BRAKE MECHANISM OF FISHING REEL

(71) Applicant: OKUMA FISHING TACKLE CO., LTD., Taichung (TW)

(72) Inventors: Liang-Jen Chang, Taichung (TW); Ching-Po Liao, Taichung (TW)

(73) Assignee: Okuma Fishing Tackle Co., Ltd., Taichung (TW)

( * ) Notice: Subject to any disclaimer, the term of this patent is extended or adjusted under 35 U.S.C. 154(b) by 0 days.

(21) Appl. No.: 15/397,897

(22) Filed: Jan. 4, 2017

(51) Int. Cl.
*A01K 89/015* (2006.01)
*A01K 89/033* (2006.01)

(52) U.S. Cl.
CPC ......... *A01K 89/046* (2015.05); *A01K 89/054* (2015.05)

(58) Field of Classification Search
CPC ............ A01K 89/015; A01K 89/01903; A01K 89/01905; A01K 89/01906; A01K 89/01907; A01K 89/033; A01K 89/05; A01K 89/059
See application file for complete search history.

(56) References Cited

U.S. PATENT DOCUMENTS

| | | | | |
|---|---|---|---|---|
| 1,554,786 A | * | 9/1925 | Case ................. | A01K 89/015 242/268 |
| 4,572,455 A | * | 2/1986 | Noda ................. | A01K 89/015 242/267 |
| 4,763,856 A | * | 8/1988 | Kaneko .............. | A01K 89/015 242/268 |
| 4,899,953 A | * | 2/1990 | Toda .................. | A01K 89/033 242/223 |
| 4,901,944 A | * | 2/1990 | Aoki .................. | A01K 89/033 242/260 |
| 4,966,335 A | * | 10/1990 | Kaneko .............. | A01K 89/015 242/255 |
| 5,018,682 A | * | 5/1991 | Aoki .................. | A01K 89/033 242/268 |
| 5,118,049 A | * | 6/1992 | Roberts .............. | A01K 89/015 242/268 |
| 5,192,036 A | * | 3/1993 | Sato .................. | A01K 89/033 242/268 |
| 5,588,605 A | * | 12/1996 | Yamaguchi ......... | A01K 89/033 242/268 |
| 6,047,913 A | * | 4/2000 | Yamaguchi ......... | A01K 89/015 242/310 |
| 6,189,823 B1 | * | 2/2001 | Kobayashi .......... | A01K 89/015 242/312 |

(Continued)

*Primary Examiner* — Emmanuel M Marcelo
(74) *Attorney, Agent, or Firm* — Muncy, Geissler, Olds & Lowe, P.C.

(57) ABSTRACT

A brake mechanism of a fishing reel is provided, which includes a washer set, an operation member, a tubular member and a brake adjusting device. The fishing reel includes a shaft. The washer set includes a first driving washer and a first brake washer sleeved to the shaft. The operation member is coupled with the first driving washer, rotatable together, extended through the washer set, located between the shaft and washer set, and abutted against the washer set. The tubular member is axially movably disposed at the shaft and abutted against the operation member. The brake adjusting device is sleeved to the shaft and abutted against the tubular member and includes a control member screwingly engaged to a thread section of the shaft. Accordingly, the shaft would not be damaged by the washer set, and a brake status being released smoothly can be ensured.

10 Claims, 7 Drawing Sheets

(56) References Cited

U.S. PATENT DOCUMENTS

| | | | |
|---|---|---|---|
| 6,983,905 B2 * | 1/2006 | Kitajima | A01K 89/027 242/245 |
| 2012/0056028 A1 * | 3/2012 | Kawasaki | A01K 89/033 242/267 |
| 2015/0208632 A1 * | 7/2015 | Hyun | A01K 89/053 242/268 |

* cited by examiner

BRAKE MECHANISM OF FISHING REEL

BACKGROUND OF THE INVENTION

1. Field of the Invention

The present invention relates generally to fishing reel and more particularly, to a brake mechanism of a fishing reel.

2. Description of the Related Art

In general, a fishing rod would be equipped with a fishing reel, so that a user can cast a fishing lure or bait to a further distance and pull a fish back by the fishing reel when the fish is hooked. In addition, a user can use a brake mechanism of the fishing reel to confront a larger and stronger fish. For example, if a fishing reel with a spool driven by a gear sleeved to a shaft is used, a user can adjust a frictional force between a washer set of the brake mechanism and the gear, so that a damping for a motion which the spool rotates relative to the shaft is changed, and stamina of the fish can be depleted, or a fishing line being broken or a hook being unhooked by the fish can be prevented. However, the washer set is usually consist of one or more pairs of driving washers and brake washers, and part of driving washers has a non-circular hole through which the shaft extends and is sleeved at a non-circular section of the shaft, so that the driving washers can rotate along with the shaft. In the practical operation, it is easy to damage the shaft when being pressed by peripheries of the non-circular holes of the driving washers. Furthermore, the driving washers may be stuck on the shaft, so that a brake status of the brake mechanism cannot be released. Accordingly, how to prevent the brake mechanism from damaging the shaft is one of objectives which the related industry wants to achieve.

SUMMARY OF THE INVENTION

The present invention has been accomplished in view of the above-noted circumstances. It is an objective of the present invention to provide a brake mechanism of a fishing reel. The brake mechanism can prevent the shaft from being damaged or stuck by the washer set which may not able to move axially, and a brake status of the brake mechanism being released smoothly can be ensured.

To attain the above objective, the present invention provides a brake mechanism of a fishing reel. The fishing reel has a main body, a shaft rotatably disposed at the main body, a handle disposed at the shaft and rotatable along with the shaft, a gear sleeved to the shaft, and a spool disposed at the main body and rotatable by the gear. The shaft has a circular section to which the gear is sleeved, a non-circular section extending outwardly from the circular section, and a thread section extending outwardly from the non-circular section. The brake mechanism comprises a washer set, an operation member, a tubular member and a brake adjusting device. The washer set comprises a first driving washer having a first non-circular hole through which the shaft extends, and a first brake washer sleeved to the shaft and located between the first driving washer and the gear. The operation member is respectively coupled with the first driving washer and the shaft and rotatable together with the first driving washer and the shaft; the operation member has a bushing portion having a second non-circular hole through which the shaft extends and sleeved at the non-circular section, and a disk portion extending radially from an end of the bushing portion; the bushing portion is extended through the washer set and located between the shaft and the washer set; and an inner side of the disk portion is abutted against an outer side of the washer set. The tubular member is axially movably disposed at the non-circular section of the shaft and provided with an end abutting against an outer side of the operation member. The brake adjusting device is sleeved to the shaft and abutted against an outer side of the tubular member, and the brake adjusting device comprises a control member screwingly engaged to the thread section of the shaft.

Accordingly, the shaft is protected by the bushing portion of the operation member, so that the shaft would not be pressed by a periphery of the first non-circular hole, and the first driving washer still can be driven by the operation member to rotate along with the shaft. In addition, the bushing portion is extended through the washer set, and the bushing portion has a certain length in axial direction, so that it is not easier to damage the shaft by a periphery of the second non-circular hole of the bushing portion.

DETAILED DESCRIPTION OF THE INVENTION

Figure 1:
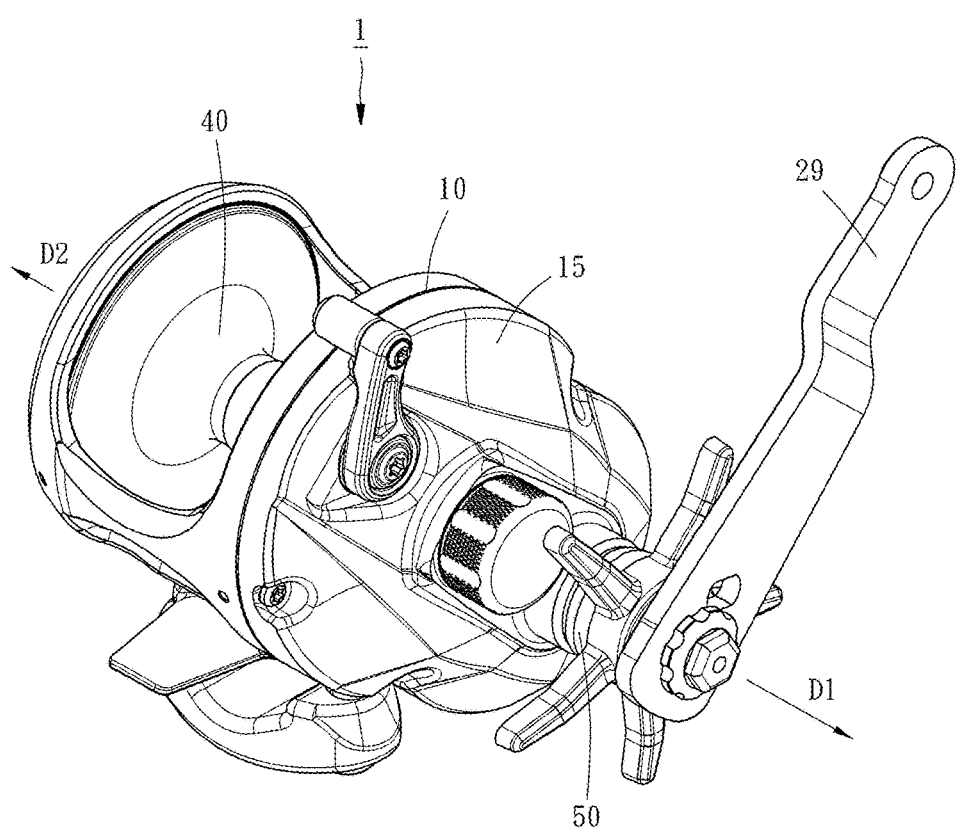
FIG. 1 is a perspective view of a fishing reel according to a preferred embodiment of the present invention.
Figure 2:
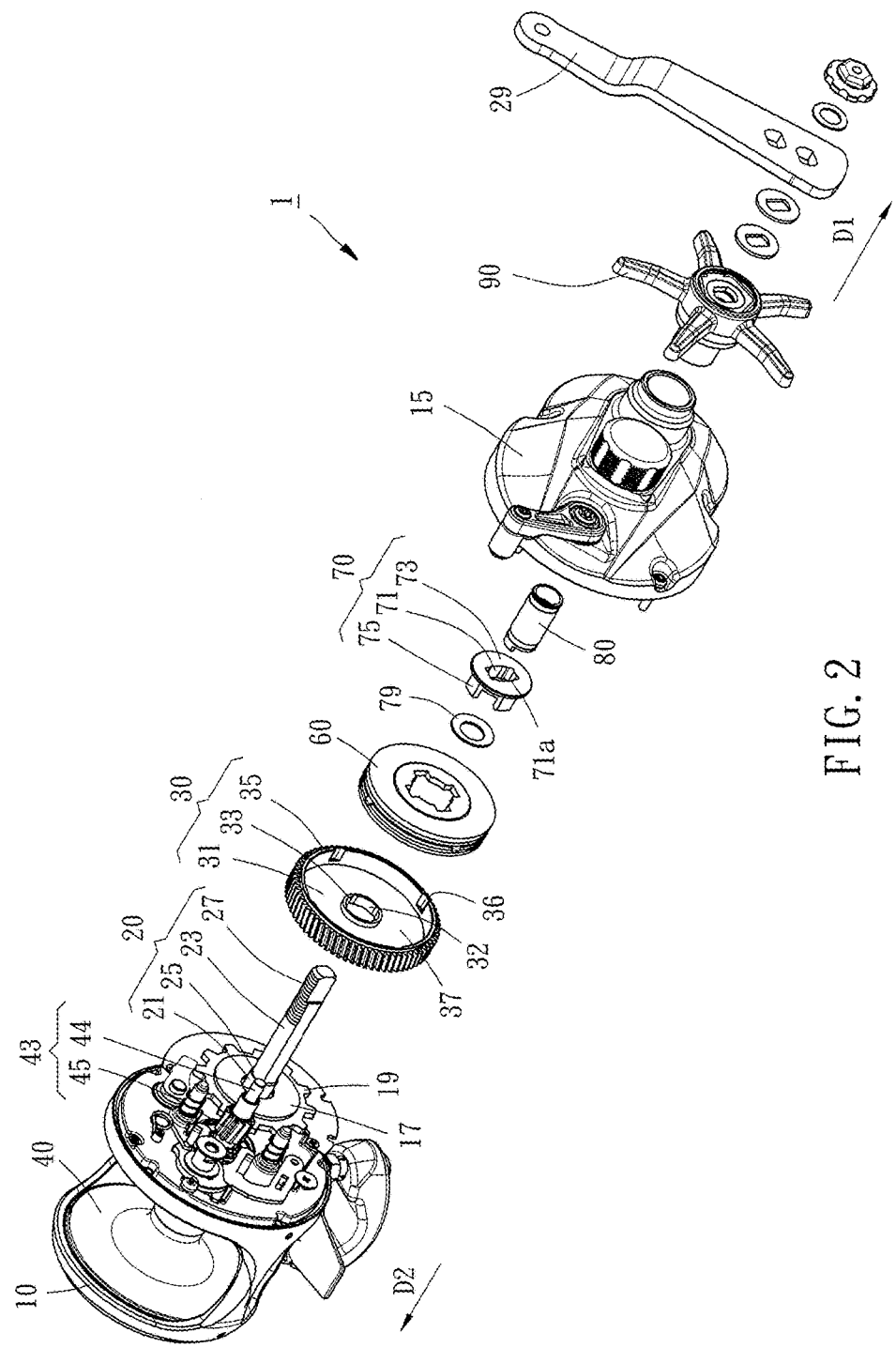
FIG. 2 is an exploded perspective view of part of the fishing reel according to the preferred embodiment of the present invention.
Figure 5:
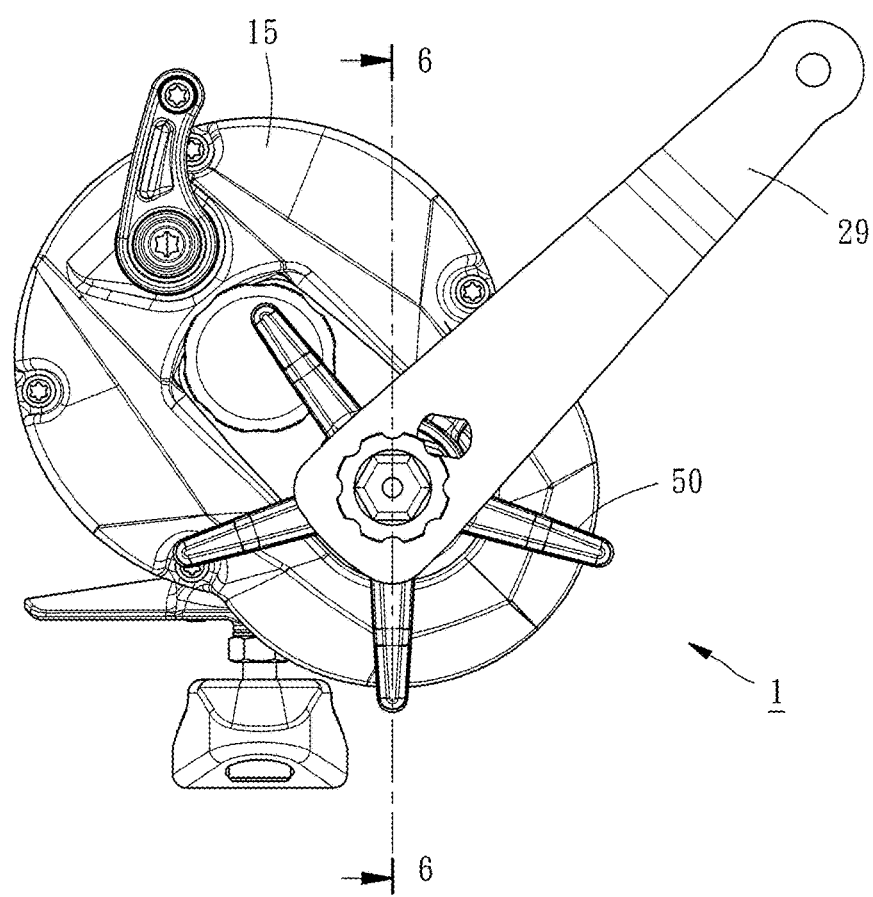
FIG. 5 is a side view of the fishing reel according to the preferred embodiment of the present invention.

Referring to FIGS. 1, 2 and 5, a fishing reel 1 according to a preferred embodiment of the present invention includes a main body 10, a side cover 15, a shaft 20, a handle 29, a gear 30, a spool 40, a transmitting device 43 and a brake mechanism 50. It should be noticed that, in the present description, a direction D1 as shown in FIG. 1 points to outside of the fishing reel 1, and a direction D2 points to inside of the fishing reel 1.

The side cover 15 is disposed at a side of the main body 10. The shaft 20 is extended outwardly from the main body 10 and rotatably disposed at the main body 10. The shaft 20 includes a circular section 21 to which the gear 30 is sleeved, a non-circular section 23 extending outwardly from the circular section 21, a stair portion 25 located between the circular section 21 and the non-circular section 23, and a thread section 27 extending outwardly from the non-circular section 23.

An end of the handle 29 is disposed at the shaft 20, and the handle 29 can drive the shaft 20 to rotate together.

Figure 6:
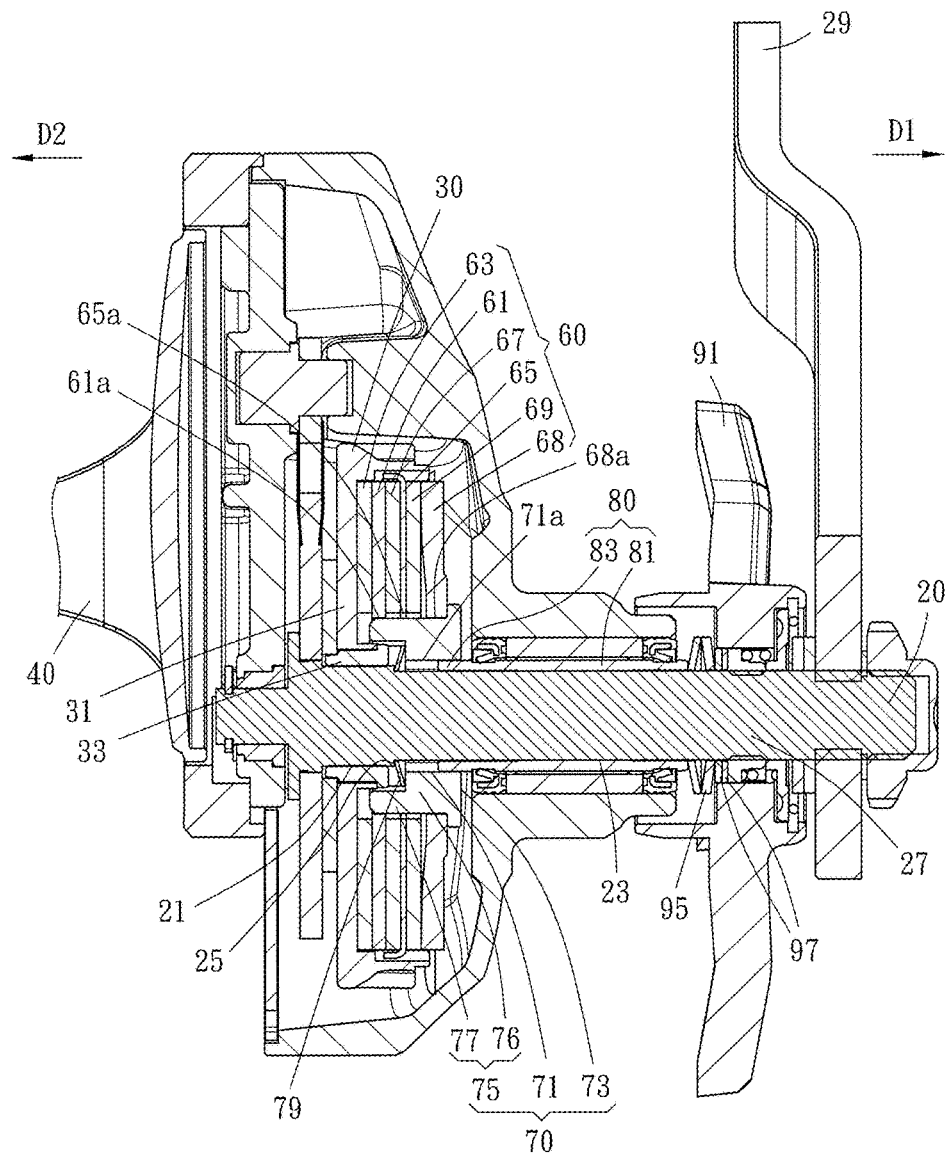
FIG. 6 is a section view of part of FIG. 5 along a direction 6-6, which illustrates the fishing reel is in a non-brake status.

The gear 30 has a disk body 31 having an axial hole 32, an inner ring 33 disposed in the axial hole 32 and sleeved at the circular section 21 of the shaft 20, and an annular teeth portion 35 extended radially and outwardly from an outer periphery of the disk body 31. An axial length of the inner ring 33 is longer than a thickness of the disk body 31 as shown in FIG. 6, and the inner ring 33 may be made from brass or other material with high abrasion resistant. Four notches 36 are disposed at the side of the annular teeth portion 35 toward the axial hole 32. The disk body 31, the inner ring 33 and the annular teeth portion 35 are rounding to form a circular notch 37. Furthermore, the gear 30 can rotate relative to the shaft 20. It should be noticed that, the inner ring 33 is used for enlarging a contact area between the gear 30 and the shaft 20, so that the gear 30 can rotate steadily. However, in other embodiments, the gear 30 may not have the inner ring 33, and a periphery of the axial hole 32 and/or the circular section 23 of the shaft 20 may be made from any material with high abrasion resistant.

The spool 40 is rotatably disposed at the main body 10. The transmitting device 43 has a spindle 44 connected with the spool 40 and rotatable together with the spool 40, and a second gear 45 disposed at the spindle 44 and engaged with the annular teeth portion 35 of the gear 30, so that the spool 40 can be driven by the gear 30 to rotate. On the other hand, when a fishing line is reeled out from the spool 40, the gear 30 can be driven by the transmitting device 43 to rotate.

Referring to FIGS. 2 to 4 and 6, the brake mechanism 50 has a washer set 60, an operation member 70, a spring member 79, a tubular member 80 and a brake adjusting device 90.

Figure 3:
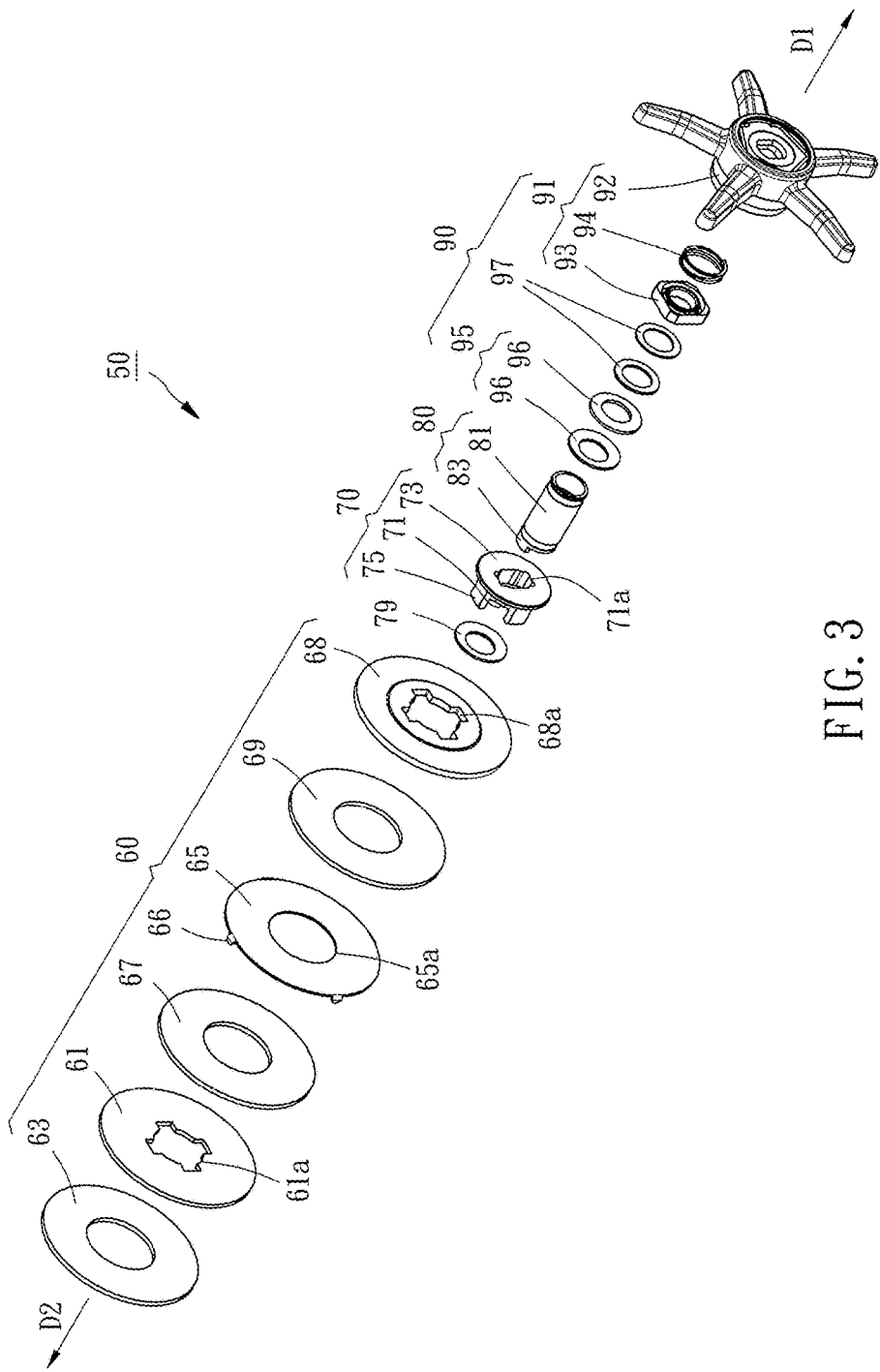
FIG. 3 is an exploded perspective view of a brake mechanism of the fishing reel according to the preferred embodiment of the present invention.
Figure 4:
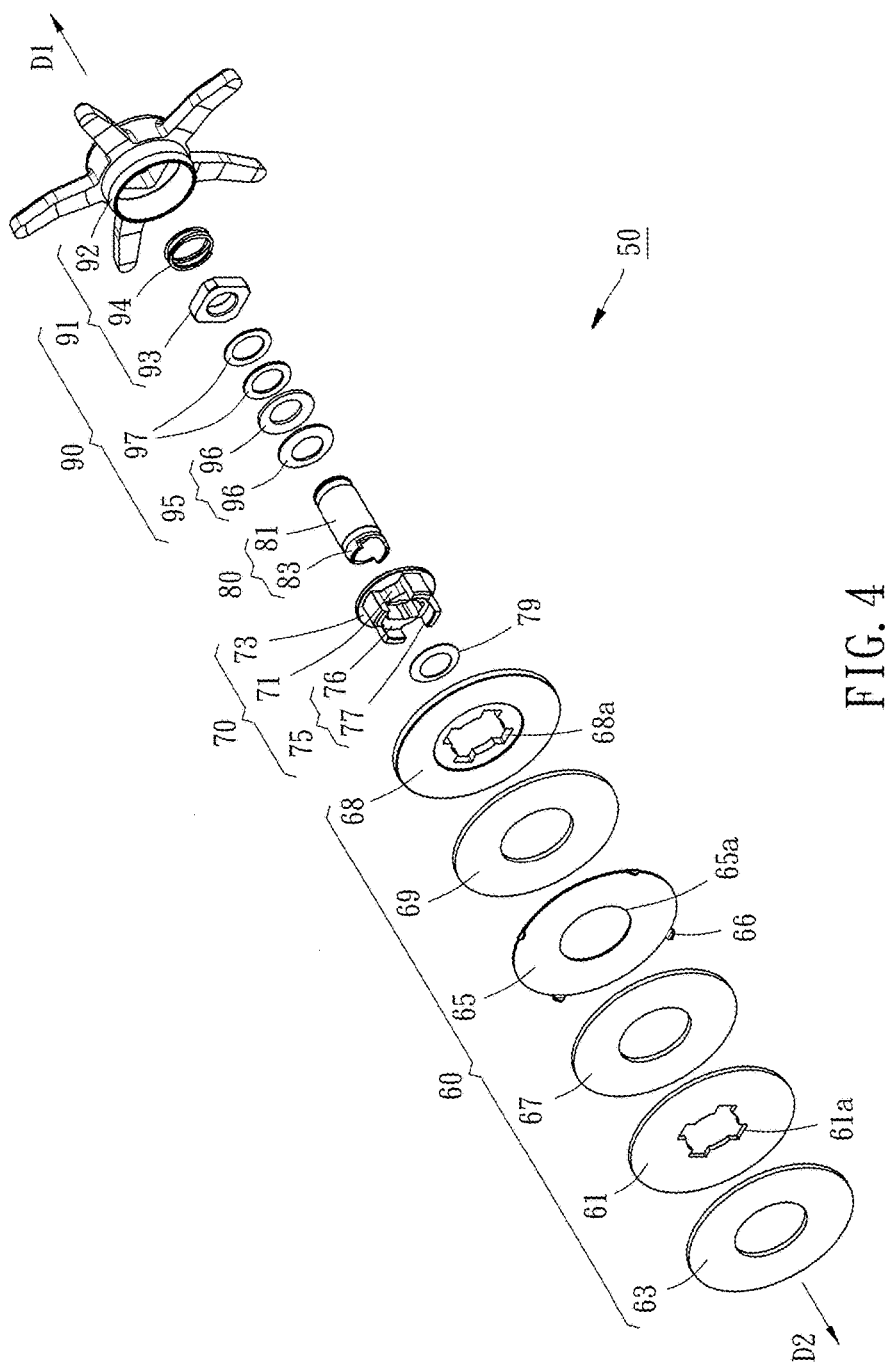
FIG. 4 is another exploded perspective view of the brake mechanism of the fishing reel according to the preferred embodiment of the present invention.

Referring to FIGS. 3, 4 and 6, the washer set 60 is accommodated in the circular notch 37 of the gear 30. The washer set 60 includes a first driving washer 61 having a first non-circular hole 61a through which the shaft 20 extends, a first brake washer 63 sleeved to the shaft 20 and located between the first driving washer 61 and the gear 30, a second driving washer 65 having a circular hole 65a through which the shaft 20 extends, a second brake washer 67 sleeved to the shaft 20 and located between the second driving washer 65 and the first driving washer 61, a third driving washer 68 having a third non-circular hole 68a through which the shaft 20 extends, and a third brake washer 69 sleeved to the shaft 20 and located between the second driving washer 65 and the third driving washer 68. A periphery of the second driving washer 65 has four protruded portions 66 respectively inserting into the four notches 36, so that the second driving washer 65 is coupled with the gear 30 and rotatable together with the gear 30, which means the second driving washer 65 can rotate relative to the shaft 20. Furthermore, when an external force toward the direction D2 is applied on the washer set 60, the whole washer set 60 would transmit the external force the gear 30, so that frictional forces for rotations of the gear 30 and the second driving washer 65 relative to the first and third driving washers 61, 68 would be enlarged with the external force.

It should be noticed that, there may be lots of embodiments of the washer set 60. For example, the washer set 60 may merely have the first driving and brake washers 61, 63; the washer set 60 may have more second and third driving washers 65, 68 and more second and third brake washers 67, 69; or a fourth brake washer 17 and a fourth driving washer 19 coupled with the shaft 20 and rotatable along with the shaft 20 may be disposed at an inner side of the gear 30 as shown in FIG. 2, and any structure which is capable of braking the gear 30 can be applied.

Referring to FIGS. 3, 4 and 6, the operation member 70 has a bushing portion 71 having a second non-circular hole 71a through which the shaft 20 extends and sleeved at the non-circular section 23, a disk portion 73 extending radially from an end of the bushing portion 71, and four protruded blocks 75 extending radially from the bushing portion 71. The bushing portion 71 is extended into the washer set 60 and located between the shaft 20 and the washer set 60, and the bushing portion 71 is coupled with the shaft 20, so that the operation member 70 can rotate along with the shaft 20. An inner side of the disk portion 73 is abutted against an outer side of the washer set 60. Referring to FIG. 6, each protruded block 75 has a connecting portion 76 connected with the bushing portion 71 and extending into the third non-circular hole 68a of the third driving washer 68, and an arm portion 77 extending axially from the connecting portion 76 and into the first non-circular hole 61a of the first driving washer 61, so that the first and third driving washers 61, 68 are coupled with the operation member 70 and rotatable together with the operation member 70, which means the first and third driving washers 61, 68 would not rotate relative to the shaft 20.

Figure 7:
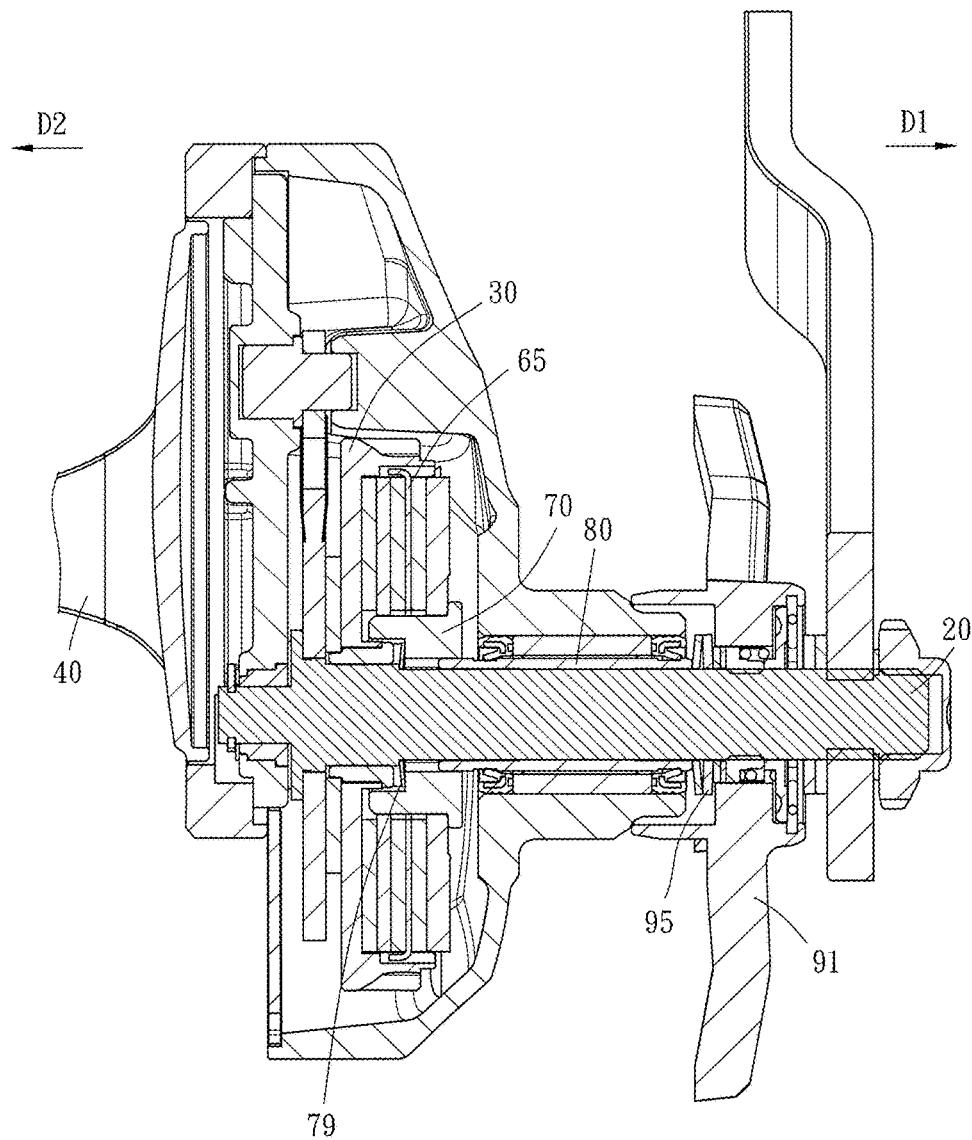
FIG. 7 is another section view of the fishing reel according to the preferred embodiment of the present invention, which illustrates the fishing reel is in a brake status.

Referring to FIGS. 3, 4 and 6, the spring member 79 is sleeved at the non-circular section 23 of the shaft 20 and provided with two ends respectively abutting against an outer side of the stair portion 25 and an inner side of the bushing portion 71, and the spring member 79 is a spring washer. Therefore, a force toward the direction D1 would be applied on the operation member 70 by the spring member 79. Furthermore, when another force toward the direction D2 is applied on the operation member 70, the spring member 79 can be pressed as shown in FIG. 7.

Referring to FIGS. 3, 4 and 6, the tubular member 80 has a tubular body 81 axially movably sleeved at the non-circular section 23 of the shaft 20, and two coupled portions 83 extending toward the operation member 70 from an end of the tubular body 81. The coupled portions 83 are extended into the second non-circular hole 71a of the bushing portion 71, so that the tubular member 80 is coupled with the operation member 70 and rotatable together with the operation member 70. Furthermore, when the shaft 20 is driven by the handle 29 to rotate, the operation member 70 would be driven by the shaft 20 to rotate together with the first and third driving washers 61, 68 and the tubular member 80.

Referring to FIGS. 3, 4 and 6, the brake adjusting device 90 is sleeved to the shaft 20 and abutted against an outer side of the tubular member 80. The brake adjusting device 90 includes a control member 91, a second spring member 95 sleeved to the shaft 20 and located between the tubular member 80 and the control member 91, and two normal washers 91 sleeved to the shaft 20 and located between the second spring member 95 and the control member 91. The control member 91 has a star drag 92, a nut 93 screwingly engaged to the thread section 27 of the shaft 20 and coupled with the star drag 92, and a spring 94 located between the star drag 92 and the nut 93. The second spring member 95 includes two second spring washers 96. A force toward the direction D1 is applied on the control member 91 and the two normal washers 97, and another force toward the direction D2 is applied on the tubular member 80 by the second spring member 95. Furthermore, when the control member 91 is screwingly threaded toward the direction D2, the control member 91 would move toward the direction D2 and push the second spring member 95 through the two normal washers 97, so that the second spring member 95 pushes the tubular member 80, and the tubular member 80 moves toward the operation member 70. In addition, when the tubular member 80 cannot move anymore, the control member 91 may keep being screwingly threaded toward the direction D2, so that the second spring member 95 is pressed as shown in FIG. 7.

The aforementioned description is related to the structural design of the brake mechanism 50, and one of objectives of the structural design is providing a brake function for the spool 40. In the following, a brake control method of the brake mechanism 50 would be described with FIGS. 6 and 7.

Referring to FIG. 6, when the control member 91 of the brake adjusting device 90 is screwingly threaded toward the direction D2, a brake force can be transmitted by the control member 91 through the two normal washers 91, the second spring member 95, the tubular member 80 and the operation member 70, so that a frictional forces for the rotations of the gear 30 and the second driving member 65 relative to the shaft 20 would be enlarged, a damping for a motion which the spool 40 rotates relative to the shaft 20 is also enlarged as shown in FIG. 7, which makes the fishing line stop being reeled out, and the a rotation of the handle 29 would drive the gear 30 to rotate together with the spool 40.

It should be noticed that, the rotation of the first and third driving washer 61, 68 is driven by the operation member 70, and the first and third driving washers 61, 68 would not be engaged with the shaft 20, so that the shaft 20 would not be damaged by the first and third driving washers 61, 68. In addition, the bushing portion 71 has a certain length in axial direction, and therefore the shaft 20 would not easy to be damaged or stuck by the periphery of the second non-circular hole 71a. Because of the special structural design of the operation member 70, more space between the washer set 60 and the shaft 20 can accommodate the inner ring 33 of the gear 30, so that the axial length of the inner ring 33 can be enlarged, and the gear 30 can rotate steadily. By using the aforementioned structure, when a user make the control member 91 be screwingly threaded toward the direction D2, the brake force can be transmitted by the operation member 70 to the washer set 60, so that the damping for the rotation of the spool 40 would be enlarged. In the meantime, if the user rotate the handle 29, a rotation force also can be transmitted to the washer set 60, even the spool 40 can rotate together with the spool 40, and the operation member 70 can protect the shaft 20.

On the other hand, how to release the brake status would be described in the following. Referring to FIG. 7, when the control member 91 of the brake adjusting device 90 is screwingly threaded toward the direction D1, a force would be applied on the operation member 70 by the spring member 79 to move the operation member 70 toward the tubular member 80, so that the frictional forces for the rotations of the gear 30 and the second driving member 65 relative to the shaft 20 would be decreased, the damping for the motion which the spool 40 rotates relative to the shaft 20 is also decreased, and the brake status would be released as shown in FIG. 6 illustrating the spring member 79 is not pressed. By using the aforementioned structure, a prestressing force provided by the spring member 79 would be applied for releasing the brake status reliably. Therefore, the brake status would be released quickly when the control member 91 is screwingly threaded toward the direction D1 by the user during a fish is hooked. Even though the operation member 70 is stuck on the shaft 20 (whereas the chance is very small), the operation member 70 still can be drive by the spring member 79 to move along with the shaft 20, so that brake status being released can be ensured.

Based on the spirit of the invention, the structure of the brake mechanism 50 can be modified. For example, the design of the operation member 70 is not limited in the four protruded blocks 75, and any structure with a non-circular cross section and capable of being coupled with the first and third driving washers 61, 68 can be applied. The axial length of the bushing portion 71 can be modified depending on requirement, however, the axial length cannot be too small, otherwise it is easy to damage the shaft 20. The tubular body 81 of the tubular member 80 may have a fourth non-circular hole (not shown) coupled with the shaft 20 and be rotatable along with the shaft 20. The spring member 79 is used for ensuring that the brake status can be released, however, the brake status still can be released without the spring member 79 in normal situation. The second spring member 95 is used for providing a restoring force to the control member 91 and the tubular member 80 and providing a buffer for the brake force, however, the second spring member 95 can be omitted or replaced by other washer, and performing a brake or releasing the brake status still can be operated properly. Furthermore, the spring member 79 and the second spring member 95 can be a spring or other elastic member.

The above description represents merely the preferred embodiment of the present invention, without any intention to limit the scope of the present invention. The simple variations and modifications not to be regarded as a departure from the spirit of the invention are intended to be included within the scope of the following claims.

What is claimed is:

1. A brake mechanism of a fishing reel, the fishing reel having a main body, a shaft rotatably disposed at the main body, a handle disposed at the shaft and rotatable along with the shaft, a gear sleeved to the shaft, and a spool disposed at the main body and rotatable by the gear; the shaft having a circular section to which the gear is sleeved, a non-circular section extending outwardly from the circular section, and a thread section extending outwardly from the non-circular section; the brake mechanism comprising:
   a washer set, comprising a first driving washer having a first non-circular hole through which the shaft extends, and a first brake washer sleeved to the shaft and located between the first driving washer and the gear;
   an operation member, respectively coupled with the first driving washer and the shaft and rotatable together with the first driving washer and the shaft; the operation member having a bushing portion having a second non-circular hole through which the shaft extends and sleeved at the non-circular section, and a disk portion extending radially from an end of the bushing portion; the bushing portion extending through the washer set and located between the shaft and the washer set; an inner side of the disk portion abutting against an outer side of the washer set;
   a tubular member, axially movably disposed at the non-circular section of the shaft and provided with an end abutting against an outer side of the operation member; and
   a brake adjusting device, sleeved to the shaft and abutting against an outer side of the tubular member, the brake adjusting device comprising a control member screwingly engaged to the thread section of the shaft.

2. The brake mechanism of the fishing reel as claimed in claim 1, wherein the operation member further has at least one protruded block extending radially from the bushing portion, and the protruded block extends into the first non-circular hole.

3. The brake mechanism of the fishing reel as claimed in claim 2, wherein the washer set further comprises a second driving washer having a circular hole through which the shaft extends, a second brake washer sleeved to the shaft and located between the second driving washer and the first driving washer, a third driving washer having a third non-circular hole through which the shaft extends, and a third brake washer sleeved to the shaft and located between the second driving washer and the third driving washer; the gear has at least one notch; a periphery of the second driving washer has at least one protruded portion inserting into the at least one notch, so that the second driving washer is coupled with the gear and rotatable together with the gear; the protruded block has a connecting portion connecting the bushing portion and extending through the third non-circular hole, and an arm portion extending axially from the connecting portion and into the first non-circular hole, so that the first and third driving washers are coupled with the operation member and rotatable together with the operation member.

4. The brake mechanism of the fishing reel as claimed in claim 1, wherein an axial length of the bushing portion is longer than a thickness of the first driving washer.

5. The brake mechanism of the fishing reel as claimed in claim 1, wherein the tubular member has a tubular body and a coupled portion extending toward the operation member from an end of the tubular body; the coupled portion extends into the second non-circular hole, so that the tubular member is coupled with the operation member and rotatable together with the operation member.

6. The brake mechanism of the fishing reel as claimed in claim 1, wherein the shaft has a stair portion located between the circular section and the non-circular section; the brake mechanism further has a spring member sleeved at the non-circular section of the shaft and provided with two ends abutting against an outer side of the stair portion and an inner side of the bushing portion, respectively.

7. The brake mechanism of the fishing reel as claimed in claim 6, wherein the spring member is a spring washer.

8. The brake mechanism of the fishing reel as claimed in claim 6, wherein the gear has a disk body having an axial hole, and an inner ring disposed in the axial hole and sleeved to the circular section of the shaft; an axial length of the inner ring is longer than a thickness of the disk body.

9. The brake mechanism of the fishing reel as claimed in claim 1, wherein the brake adjusting device further has a second spring member sleeved to the shaft and located between the tubular member and the control member.

10. The brake mechanism of the fishing reel as claimed in claim 9, wherein the second member comprises a plurality of second spring washers.

* * * * *